Dec. 10, 1940.    B. F. MADSEN    2,224,192
POWER TRANSMITTING MECHANISM
Filed Sept. 24, 1937
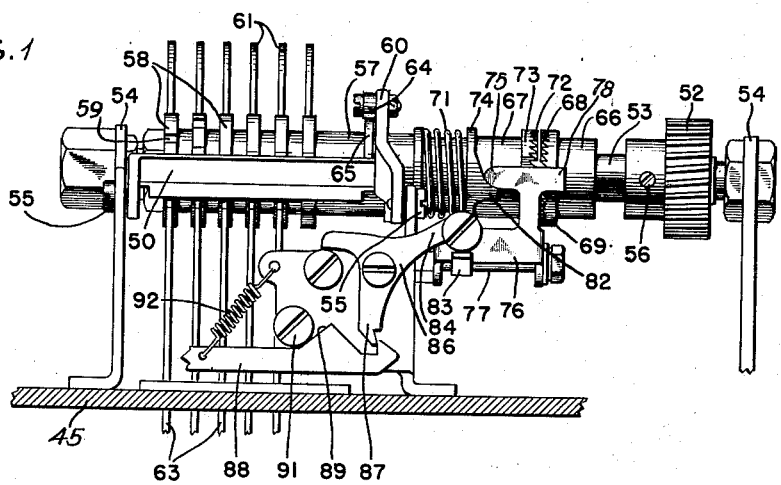
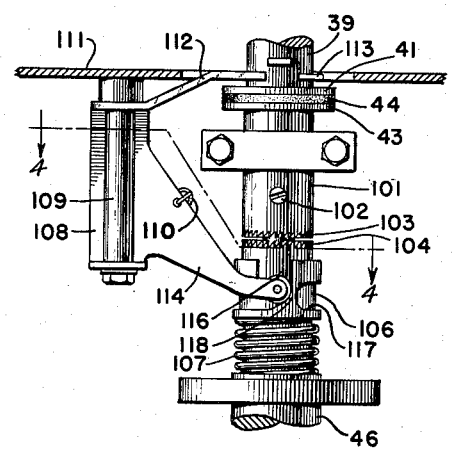
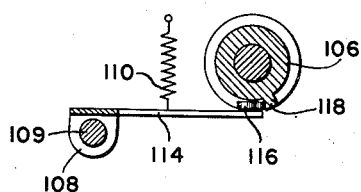
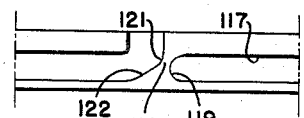
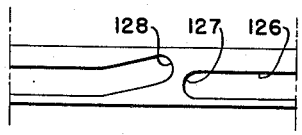
INVENTOR.
BERTHEL F. MADSEN
BY
ATTORNEY.

Patented Dec. 10, 1940

2,224,192

UNITED STATES PATENT OFFICE 2,224,192

POWER TRANSMITTING MECHANISM

Berthel F. Madsen, Chicago, Ill., assignor to Teletype Corporation, Chicago, Ill., a corporation of Delaware Application September 24, 1937, Serial No. 165,437

8 Claims. (Cl. 192—24)

This invention relates to power transmitting devices, and particularly to positive engagement clutches through which rotation may be imparted from a continuously operable driving source to an intermittently operable shaft.

The invention exhibits particular utility in printing telegraph apparatus but its application is not limited to such apparatus as it possesses characteristics which may render it useful in many other classes of mechanisms.

An object of the invention is to effect interconnection between the driving and driven portions of a clutch mechanism in a positive manner so as to obviate relative angular motion between the driving and driven portions in excess of one tooth distance, and to maintain positively such engagement during the cycle of operation of the clutch.

The invention features devices for preventing clutch members that are capable of axial movement upon a shaft from undergoing such movement except in specific angular positions of the clutch members.

Clutch mechanisms comprising interengageable toothed members are frequently employed for shafts or rotatable sleeves mounted on shafts to which are secured one or more cams that are engaged by cam followers, and that have prominent apices. Such clutch mechanisms are found in many printing telegraph devices and in other machines entirely foreign to the art of printing telegraphy. As applied to printing telegraph mechanisms, these clutches are frequently of the single revolution species, by which is meant that the clutch is tripped to permit interengagement of the driving and driven members and such interengagement is maintained to effect one complete revolution of the shaft or sleeve to which motion is to be imparted, whereupon the two clutch members are automatically separated to cause the driven shaft or sleeve to be brought to rest. It sometimes happens that when the apex of a cam carried thereby passes the cam follower, which may be under the influence of a very powerful restoration spring so that considerable force is exerted by the cam follower upon the descending surface against which it rides, the cam follower may operate as a negative load upon the cam shaft or sleeve to tend to rotate the driven portion at an angular velocity exceeding that of the driving portion. In spring loaded, one-way driving tooth clutches, if the camming action between the toothed elements resulting from the generation in the driven element of a powerful torque exceeds the holding force of the spring, the teeth of the driven element may ride over those of the driving element, permitting the driven element to advance with respect to the driving element, and introducing faults in timing.

According to the present invention, the lever which effects disengagement of the driving and driven members of a spring loaded jaw clutch and which, upon being tripped permits driving engagement to be established between the two primary elements of the clutch, is provided with means effective immediately after the tripping of the clutch for engaging the spring loaded axially movable portion thereof and for restraining it from moving axially sufficiently to permit its teeth to pass those of the driving element until just before the regular separation of the elements for arrestment of the driven shaft or sleeve.

The invention is exemplified by various embodiments, which have been disclosed as applied to printing telegraph apparatus in accordance with the disclosure of copending application Serial No. 77,796, filed May 4, 1936, by A. H. Reiber. Reference may be had to the above identified application for a detailed description of the construction and operation of the printing telegraph apparatus.

For a full and complete understanding of the invention, reference may be had to the following detailed description taken in conjunction with the accompanying drawing, wherein Fig. 1 is an elevational view of transmitting mechanism of a printing telegraph apparatus including one embodiment of the invention;

Fig. 2 is a detailed perspective view of the clutch mechanism shown in Fig. 1;

Fig. 3 is an elevational view of a portion of the main cam shaft of a printing telegraph apparatus which includes another embodiment of the invention;

Fig. 4 is a sectional view taken approximately on the line 4—4 of Fig. 3;

Fig. 5 is a diagrammatic view showing a development of the surface of one of the clutch sleeves of Fig. 3; and Fig. 6 is a diagrammatic view showing a development of the surface of a modified form of clutch sleeve.

Referring now to Fig. 1, it will be observed that a gear 52 is mounted on shaft 53 rotatably supported in brackets 54 and is connected to impart rotation to said shaft by means of set screw 56. Shaft 53 also carries a sleeve 57 on which are mounted a plurality of transmitting cams 58. Each of cams 58 is provided with a recess 59 and the several recesses are arranged in helical alignment around sleeve 57. Transmitting cams 58 individually control transmitting levers 61 each of which controls a transmitting contact spring as is fully disclosed in the copending application. The control of transmitting levers 61 by transmitting cams 58 is supervised by a set of pivoted levers 63 extending upwardly from the interior of a base casting 45. Within the casting 45, pivoted levers 63 are articulated to permutation code bars (not shown) the permutational setting of which is effected by operation of the key levers of a keyboard mechanism (not shown). A locking bail 50 pivoted at 55 cooperates with levers 63 to hold them motionless during the period of operation of transmitting cams 58. Bail 50 is provided with arm 60 which has cam follower roll 64 in engagement with the periphery of cam 65 carried by cam sleeve 57. Cam 65 lowers bail 50 into locking relation with levers 63 just after the beginning of a cycle of operation of sleeve 57 and lifts it free of those levers just before the end of a cycle to permit the levers to be reset.

The control of transmitting contact levers 61 to effect the transmission of a code combination representing a single character is accomplished by one full revolution of cam sleeve 57. Rotation is imparted to the cam sleeve from shaft 53 through clutch elements 66 and 67. Clutch element 66 is the driving portion of the clutch and is connected to shaft 53 by key or set screw so as to be continuously rotatable therewith. Driving member 66 has teeth 68 cut in the left-hand face thereof (as viewed in Fig. 1) and adjacent the toothed face is provided with a peripheral flange 69. Driven member 67 of the clutch is mounted for axial movement upon shaft 53 and is urged toward driving member 66 by compression spring 71. Driven member 67 is connected to cam sleeve 57 by keys or splines (not shown) so that driven member 67 is always in positive driving engagement with cam sleeve 57 irrespective of the position it may occupy longitudinally of the shaft. Driven member 67 of the clutch has the right-hand face thereof, as viewed in Fig. 1, provided with teeth 72 for meshing with teeth 68 of driving member 66, and has a peripheral flange 73 adjacent to the toothed face and similar to flange 69 of driving portion 66. Flange 73 differs from flange 69 in that a portion of it is cut away as is clearly shown in Fig. 2. At the end of clutch element 67 opposite flange 73 it is provided with another flange 74 which provides a cam surface for cooperation with a clutch throwout lever 76 pivoted at 77.

Clutch throwout lever 76 has its upper end, as viewed in Fig. 1, a transversely extending arm 78 which spans annular flanges 69 and 73 of the clutch and which extends leftwardly for cooperation with the cam surface of flange 74. The left-hand end 75 of arm 78 of clutch throwout lever 76 is effective, as the clutch which comprises driving element 66 and driven element 67 approaches completion of a single revolution, to shift the driven element 67 axially of shaft 53 out of engagement with the driving element 66 whereby the clutch is arrested after a single revolution. The face of clutch throwout lever arm 78, which is presented toward flanges 69 and 73, is provided with a groove 79 proportioned to confine flanges 69 and 73 upon interengagement of clutch elements 66 and 67. Thus, a definite effective angular relationship between the clutch elements may be maintained until a single revolution of the clutch has been completed, whereupon the clutch throwout lever effects disengagement of the clutch elements through cooperation of left-hand end 75 of arm 78 with flange 74. Flange 73 is provided with a cut away portion, as shown at 81, in alignment with the apex portion 82 of flange 74 so that driven clutch portion 67 may be shifted axially while clutch throwout lever 76 remains in the position in which its groove 79 positively confined clutch portions 66 and 67 to interengagement.

Clutch throwout lever 76 includes an arm 83 which is engaged by one arm 84 of an operating lever 86. The last mentioned lever has another arm 87 which is engaged by a bar 88 associated with the universal bail (not shown) of the keyboard mechanism. Bar 88 is movable leftwardly, as viewed in Fig. 1, to effect clockwise rocking movement of lever 86, which in turn rocks clutch throwout lever 76 to withdraw its transversely extending arm 78 from restraining engagement with axially movable clutch driven portion 67. The two clutch portions are thus permitted to become interengaged. Bar 88 is provided on its upper edge with a sloping surface 89 which is held in engagement with screw 91 by spring 92. As bar 88 is moved leftwardly, its right-hand end, as viewed in Fig. 1, is moved downwardly so that lever 86 escapes from engagement with bar 88 and clutch throwout lever 76 is enabled to return immediately to clutch disabling position, in which position its groove 79 spans and locks together flanges 69 and 73. Any tendency of clutch driven element 67 to gain upon the driving element 66 due to the pressure of cam follower roll 64 upon the descending portion of the periphery of cam 65 is thus prevented by the entrance of flange 73 into recess 79 in clutch throwout lever 76 and immediate positive engagement of the two portions of the clutch is effected to assure rotation at the proper speed through a full cycle.

Another embodiment of positive clutch engagement mechanism is shown in Figs. 3 to 5 inclusive, as applied to control the operation of the main cam assembly 46 of the printing telegraph apparatus. The shaft which carries selector cam assembly 39 and main cam assembly 46 has driving clutch member 101 secured thereto by means of set screw 102. Clutch member 101 is provided, in the face thereof, with teeth 103 for cooperation with teeth 104 of the clutch member 106, which is the driven portion. Driven clutch portion 106 is slidable axially of the driving shaft and is splined or keyed by means not shown to a main cam assembly 46. A compression spring 107 urges driven portion 106 into engagement with driving portion 101, and in the normal or idle position of the mechanism, driven portion 106 is held out of engagement with driving portion 101 by clutch throwout lever 108 pivotally mounted upon stud 109 carried by a stationary frame element 111 of the printing telegraph apparatus. Clutch throwout lever 108 is provided with arm 112 presented in the path of a cam projection 113 carried by selector cam assembly 39. Arm 114 of clutch throwout lever 108, which is biased for rotation into cooperation with the clutch mechanism by spring 110, controls the engagement and disengagement of clutch elements 101 and 106 and is provided at its free end with an anti-friction roll 116.

The driven portion 106 of the clutch mechanism has in the peripheral surface thereof a groove 117 of sufficient width to receive the anti-friction roll 116. As shown in Fig. 5, groove 117 extends almost completely around the periphery of the driven clutch member 106, there being only the small rib 118 between its beginning and end points. The point of beginning is indicated by the reference numeral 119, Fig. 5, and the point at which it ends, by the reference numeral 121. It will be observed that at its end, groove 117 is open toward the plane of engagement of the two clutch members and that the wall of the groove most remote from the clutch faces has an upward slope in alignment with the opened end as shown at 122. Groove 117 is at such a distance from the toothed face 104 of driven clutch member 106 that anti-friction roll 116 may be confined within the groove when the clutch faces are engaged and that clutch throw-out lever arm 114 and anti-friction roll 116 will hold the clutch members engaged. When, in the rotation of driven member 106 of the clutch, anti-friction roll 116 encounters the sloping wall 122 of groove 117, it shifts the driven clutch member 106 away from driving member 101 to effect disengagement and thereby arrest main cam assembly 46.

As previously stated, the clutch comprising members 101 and 106 is tripped off to effect operation of cam assembly 46 by cam projection 113 included in friction driven selector cam assembly 39 cooperating with clutch throwout lever arm 112. This operation of clutch throwout lever 108 causes anti-friction roll 116 to be withdrawn from groove 117 and compression spring 107 is enabled to shift clutch member 106 into engagement with member 101. The rocking of clutch throwout lever 108 is only momentary and it returns immediately to seek presentation of anti-friction roll 116 in groove 117, which is readily accomplished due to the fact that the clutch elements are engaged and groove 117 is in registry with roll 116. Should driven portion of the clutch 106 tend to rotate faster than member 101 due to the existence of a negative load caused by the pressure of one of the cam followers upon its associated one of the main cams included in cam assembly 46, such rotation is prevented by the confinement of anti-friction roll 116 in groove 117 of clutch element 106, which is thus unable to move axially.

In Fig. 6 is shown a development of a modified clutch sleeve operable on the same principle as that shown in Figs. 3 to 5. The arrangement of Fig. 6 differs only as to the peripheral groove, designated by reference numeral 126, which is closed at both ends as indicated at 127 and 128. For a short distance back from end 128, groove 126 is directed obliquely to its principal portion, and the obliquely directed portion serves the same purpose as sloping wall 122 of groove 117, namely to separate the clutch elements through cooperation with anti-friction roll 116 at the end of a cycle of the clutch.

With reference to all three embodiments of the invention, it is to be noted that the locking device need not maintain positive and firm engagement between the clutch elements. It may be desirable to permit a small amount of freedom between the clutch elements when in driving condition. The locking device is effective for the purpose set forth if it restrains the clutch elements from separation to the extent that the teeth of one may pass by those of the other.

Although certain specific embodiments of the invention have been shown and described herein, it is to be understood that the invention is not limited to such embodiments, but is capable of modification and rearrangement within the scope of the appended claims.

What is claimed is:

1. In a power transmitting device, a continuously driven shaft, driving and driven elements carried by said shaft, one of said elements being movable axially of said shaft into and out of engagement with the other, means for moving said movable element in one direction to effect interengagement of said elements, means engageable with said movable element for moving said movable element in the other direction to separate said elements, and means disposed intermediate the last mentioned means and the engagement portion of said axially movable element for positively maintaining said axially movable element in engagement with said other element, said intermediately disposed means including a flange carried by said axially movable element having a portion cut away to accommodate the separation of said elements.

2. In a clutch mechanism, a driving element, a driven element, each of said elements having a toothed face for engagement with that of the other, means for shifting said driven element into engagement with said driving element, other means engageable with said driven element for withdrawing said driven element from engagement with said driving element, and means interposed between the last mentioned means and the toothed face of said driven element for positively maintaining said driven element in engagement with said driving element, said interposed means including a flange carried by said driven element having a portion cut away to accommodate the shifting of said driven elment by said disengagement means.

3. In a clutch mechanism, a driving element, a driven element, each of said elements having a toothed engaging face and a peripheral flange, spring means for effecting engagement between said elements, and means for disengaging said elements after each revolution of the driven element, said last mentioned means including means for confining said flanges when the driving and driven elements are engaged.

4. In a clutch mechanism, a driving element and a driven element, each of said elements having a toothed engaging face and a peripheral flange, spring means for effecting engagement between said elements, and a lever operable upon the driven element for effecting disengagement of said elements after each revolution of said driven element, said lever having a recess therein for fitting over and confining said flanges to maintain positive engagement of said clutch elements.

5. In a clutch mechanism, a driving element and a driven element, each of said elements having a toothed engaging face and a peripheral flange adjacent thereto, spring means for effecting engagement between said elements, and a lever operable upon the driven element for effecting disengagement thereof after each revolution, said lever having a recess therein for fitting over and confining said flanges to maintain positive engagement of said clutch elements, the flange of said driven element having a cut away portion presented to said lever as the angular position of disengagement is reached for releasing said flange from said recess.

6. In a clutch mechanism, a driving and a driven element, spring means for effecting engagement between said elements, and a lever operable upon the driven element for disengaging said elements after each revolution of said driven element, said driven element having a groove in the periphery thereof, said lever having means presentable in said groove upon engagement of said elements for maintaining positive engagement during the cycle of operation of said driven element, said groove having a portion of one wall thereof cut away for accommodating unrestricted disengaging movement of one of said clutch elements.

7. In a clutch mechanism, a driving and a driven element, spring means for effecting engagement between said elements, and a lever operable upon the driven element for disengaging said elements after each revolution of said driven element, said driven element having a groove in the periphery thereof, said lever carrying a member presentable in said groove upon engagement of said elements for maintaining positive engagement during the cycle of operation of said driven element, said groove having a portion of one wall thereof cut away for accommodating the said member during disengagement of said clutch elements.

8. In a power transmitting device, a driving element, an element to be driven thereby, one of said elements movable axially for engagement with and disengagement from the other, means for effecting engagement between said elements, other means for effecting disengagement of said elements, said axially movable element having a peripheral flange to be blocked against displacement by a portion of said disengagement means, said flange having a portion cut away to accommodate displacement of said flange upon disengagement of said axially movable element.

BERTHEL F. MADSEN.